United States Patent
Akesson et al.

[15] 3,658,132
[45] Apr. 25, 1972

[54] BRUSSELS SPROUT HARVESTER

[72] Inventors: Yngve Reinhold Akesson, Halsingborg; Eve Torkel Gilbert Karlsson, Bjuv, both of Sweden

[73] Assignee: Findus Produits S.A., Vevey, Switzerland

[22] Filed: Nov. 26, 1969

[21] Appl. No.: 880,251

[30] Foreign Application Priority Data

Nov. 29, 1968 Switzerland ...................17,884/68

[52] U.S. Cl. ............................................171/27, 130/30 A
[51] Int. Cl. ..................................................A01d 27/00
[58] Field of Search.................171/27, 37, 38, 60, 61, 62; 56/17, 19, 130, 27.5; 130/30, 30 A

[56] References Cited

UNITED STATES PATENTS

| | | |
|---|---|---|
| 1,004,523 | 9/1911 | Asbell.....................................171/60 |
| 1,589,502 | 6/1926 | Woodson................................171/61 |
| 2,439,278 | 4/1948 | Wurtele....................................56/17 |
| 2,645,889 | 7/1953 | Warner...................................171/38 |
| 3,339,354 | 9/1967 | Kessler...................................171/61 |
| 3,466,856 | 9/1969 | Rakestraw............................56/27.5 |
| 3,473,303 | 10/1969 | Ellis.........................................56/17 |
| 3,393,501 | 7/1968 | Meyer...................................56/27.5 |

*Primary Examiner*—Antonio F. Guida
*Attorney*—Blum, Moscovitz, Friedman, Blum & Kaplan

[57] ABSTRACT

An apparatus for stripping vegetables such as Brussels sprouts from stalks comprises a stripping conveyor and a gripping conveyor, the gripping conveyor being movable along a path which diverges from the path of the stripping conveyor. The stalks are firmly gripped by the gripping conveyor and as the conveyors diverge the vegetables are stripped from the stalks. The apparatus may be mounted on a tractor and be used for harvesting and stripping the plants. Other features of the invention appear in the following specification and drawing.

9 Claims, 8 Drawing Figures

PATENTED APR 25 1972　　　　　　　　　3,658,132
SHEET 1 OF 2
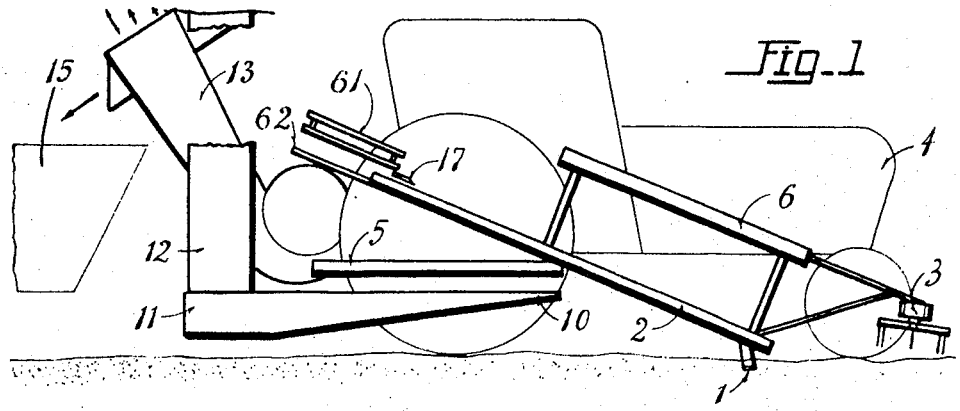
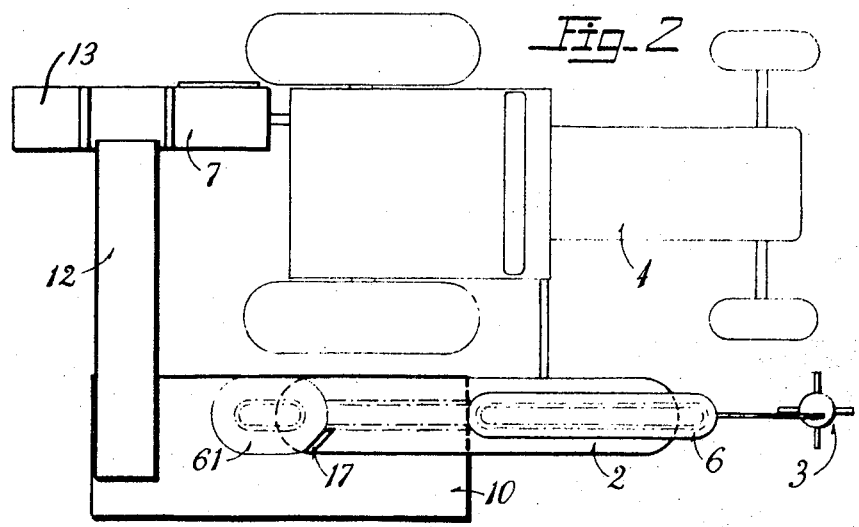
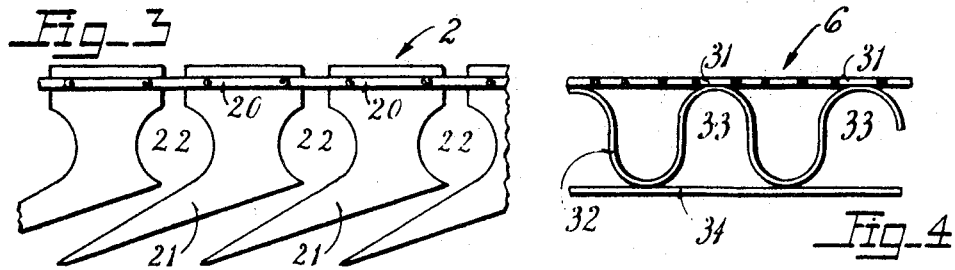
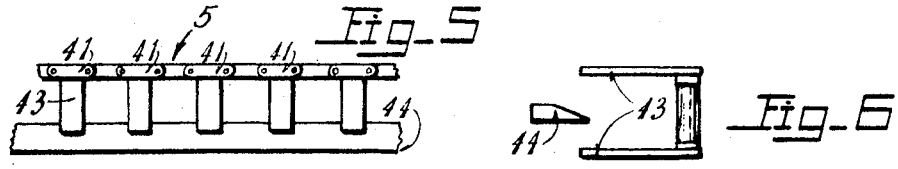

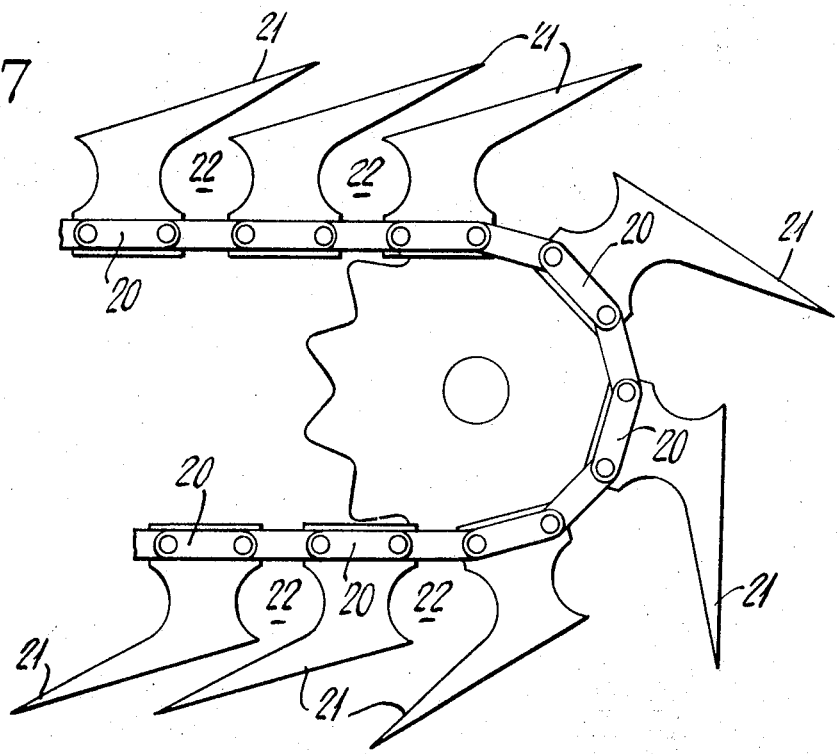
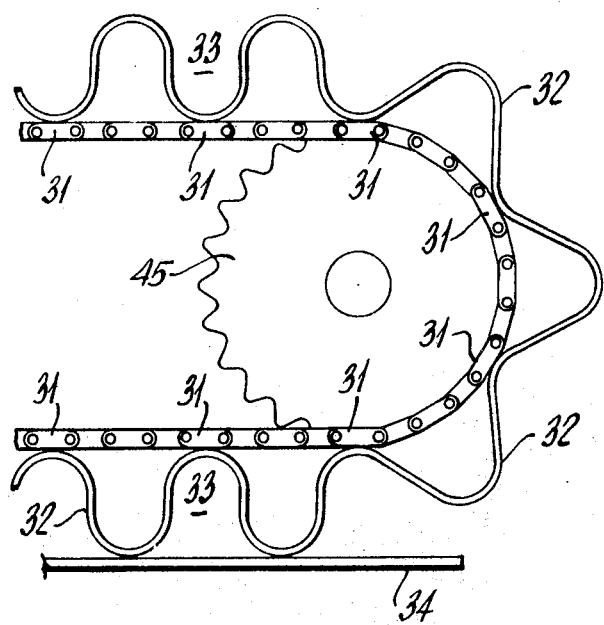

BRUSSELS SPROUT HARVESTER

The present invention is concerned with an apparatus for stripping vegetable crops from stalks, especially Brussels sprouts.

The apparatus is capable of continuously stripping the vegetables from the stalks in a single operation, and may furthermore be used as a harvester for Brussels sprouts.

According to the invention an apparatus for stripping vegetables from stalks comprises a stripping conveyor movable over a substantially straight path and provided with a plurality of stripping means adapted to substantially surround the stalks in relatively close proximity thereto, means for driving the stripping conveyor, a gripping conveyor having one extremity adjacent the stripping conveyor and being movable over a substantially straight path which diverges from the path of the stripping conveyor at an acute angle, said gripping conveyor being provided with a plurality of gripping means each associated with the stripping means and adapted to releasably engage the stalks, and means for driving the gripping conveyor.

In a preferred embodiment of the invention, the apparatus is mounted on a tractor and performs the dual function of a harvester and a stripping unit.

This embodiment is shown in the accompanying drawings, in which:

FIG. 1 is a side view showing schematically the arrangement of the principal parts of the apparatus;

FIG. 2 is a plan view of the apparatus shown in FIG. 1;

FIG. 3 is a plan view of a portion of the stripping conveyor showing the stripping means;

FIG. 4 is a plan view of a portion of an auxiliary conveyor;

FIG. 5 is a plan view of a portion of the gripping conveyor and a retaining rail;

FIG. 6 is a section through the conveyor and the rail shown in FIG. 5;

FIG. 7 is a plan view of a portion of the conveyor of FIG. 3 at a pulley; and

FIG. 8 is a plan view of a portion of the conveyor of FIG. 4 at a pulley.

The combined harvesting/stripping machine shown in FIGS. 1 and 2 is mounted on a tractor 4. The stripping conveyor 2 is inclined downwardly with respect to the direction of motion of the tractor and its lower end is close to the ground. A ploughshare 1 is resiliently mounted below the lower end of the stripping conveyor, and penetrates the ground to a depth of about 5 cm. As the tractor advances through a field, parallel to the rows of plants to be harvested, the plants are uprooted by the ploughshare and almost simultaneously, are picked up in vertical position by the stripping conveyor. A rotary rake 3 is mounted ahead of ploughshare 1, its function being to clear away fallen leaves and other debris.

The stripping conveyor 2 is supported on pulleys (not shown) driven by the tractor motor. The stripping conveyor, of which a section is shown in FIG. 3, comprises an endless chain which carries hooked fingers 21 pointed forwardly in the direction of motion of the chain. The chain is mounted on two pulleys, so that, on turning around the lower pulley the fingers separate as shown in FIG. 7 thus providing opened spaces 22 for entry of upstanding plants between adjacent fingers 21. Only the lower pulley is shown in FIG. 7, there being no point to showing the upper pulley. On the straight portion of the run of the chain, the openings close to the position shown in FIG. 3, so that the plant stalk is supported by the lowermost vegetables.

The stripping conveyor 2 is moved at a speed which corresponds to the ground speed of the tractor. An auxiliary conveyor 6, is provided above the stripping conveyor over a part of its run, its function being to maintain the stalks in an upright position. As shown in FIG. 4, the auxiliary conveyor 6 comprises a chain made up of links 31 to which is attached a flexible, undulated belt 32. The stalks are guided into the openings 33 (which expand at the pulley 45 as shown in FIG. 8), which are each associated with the openings 22 of the stripping conveyor, and are retained by a fixed rail 34 which extends over the length of this conveyor. The auxiliary conveyor 6 travels at the same speed as the stripping conveyor.

As the conveyor 2 is inclined, the plants are lifted from the ground and travel upwardly. From a point about half-way along the stripping conveyor extends a substantially horizontal gripping conveyor 5 which engages the stalks above the roots but below the fingers 21 of the stripping conveyor. This conveyor, comprises a chain with links 41 (FIGS. 5 and 6) to which are attached pairs of fingers 43, the spaces between these fingers being associated with the openings 22 between the fingers of the stripping conveyor. A horizontal retaining rail 44, parallel to the conveyor 5, is positioned between the fingers so that the stalks are firmly held between the chain and the rail.

In operation, the conveyor 5 is advanced at the same speed as the stripping conveyor and, at the end adjacent the stripping conveyor the chain turns around a pulley, so that the fingers 43 open and guide the stalks into the space between the chain of the conveyor and the rail. As the conveyors 2 and 5 diverge, the stalks, which are now firmly held close to the roots by the conveyor 5, are pulled through the openings 22 between the hooked fingers 21 of the stripping conveyor, so that the vegetables, such as sprouts, are stripped off, together with any leaves or other fragments.

The stripped vegetables and the leaves fall together into the hopper 10 and collect at the lower end 11.

The vegetables, leaves and fragments from the stalks are then transported by an elevator 12 to the top of an air separator 13, where a blast of air from the blower 7 removes the leaves while the vegetables fall into the hopper 15.

It has been found that the volume of the leaves at the tops of the plants is significant. Rather than stripping the leaves from the stalks and separating them from the product vegetables, it is preferred to cut off the top of the stalks carrying leaves by means of a fixed blade 17 (FIGS. 1 and 2) at the top of the stripping conveyor 2. The blade is parallel to the plane of movement of the conveyor and preferably traverses the conveyor at an angle as shown in FIG. 2. The heads of the stalks, carrying leaves are entrained by the conveyor 61 parallel to and above stripping conveyor 2. The construction of conveyor 61 is similar to that of conveyor 5, having fingers in superposed pairs as shown in FIGS. 5 and 6. The stalk heads are carried over the grill 62 and are discarded; the vegetables and the loose leaves pass through the grill and fall into the hopper 10.

Although the apparatus of the present invention is particularly suitable for handling Brussels sprouts, it may also be used for stripping and harvesting plants of substantially the same structure, such as kale, that is having a stalk with a root at the bottom and a crop of vegetables and/or leaves extending from the stalk above the root.

We claim

1. An apparatus for stripping vegetables from stalks, comprising a stripping conveyor movable over a substantially straight path and provided with a plurality of stripping means adapted to substantially surround and hold said stalks with sufficient clearance so that said stalks may readily be drawn therethrough while preventing passage of vegetables therethrough, and a gripping conveyor having one extremity adjacent and spaced from the stripping conveyor in a direction along the stalks toward the vegetables and being movable over a substantially straight path which diverges from the path of the stripping conveyor at an acute angle, said gripping conveyor being provided with a plurality of gripping means each associated with the stripping means and adapted to releasably engage the stalks, engaging same sufficiently firmly so that said stalks may be drawn through said stripping means.

2. An apparatus according to claim 1, in which the stripping means comprise hooked fingers spaced along an endless chain and pointed forwardly in the direction of motion of the stripping conveyor, the spaces between the fingers being substantially circular and sufficiently large to allow a plant stalk to pass therethrough.

3. An apparatus according to claim 1, in which the gripping means comprise fingers spaced in superposed pairs along an endless chain.

4. An apparatus according to claim 3, also comprising a rail parallel to the gripping conveyor and positioned between the pairs of fingers.

5. An apparatus according to claim 1, also comprising cutting means adjacent the stripping conveyor arranged to cut the heads off the stalks after the vegetables have been stripped.

6. An apparatus according to claim 1, also comprising cutting means adjacent the gripping conveyor arranged to cut the roots off the stalks after the vegetables have been stripped.

7. A tractor attachment for harvesting and stripping Brussels sprouts from stalks comprising an inclined stripping conveyor movable over a substantially straight path and provided with a plurality of stripping means adapted to substantially surround and hold said stalks with sufficient clearance so that said stalks may readily be drawn therethrough while preventing passage of vegetables therethrough, a gripping conveyor having one extremity adjacent the stripping conveyor and being movable over a substantially straight path which diverges from the path of the stripping conveyor at an acute angle, said gripping conveyor being provided with a plurality of gripping means each associated with the stripping means and adapted to releasably engage the stalks, engaging same sufficiently firmly so that said stalks may be drawn through said stripping means, blade means adjacent the lower end of the stripping conveyor arranged to uproot the stalks and a receptacle for collecting the stripped vegetables.

8. An attachment according to claim 7, also comprising am auxiliary conveyor arranged above a part of the length of the stripping conveyor and provided with means for supporting the stalks.

9. An attachment according to claim 7, also comprising a rotary rake mounted ahead of the blade means.

* * * * *